United States Patent [19]
Argabright et al.

[11] 3,893,916
[45] July 8, 1975

[54] PRECIPITATION OF METALS FROM AQUEOUS SOLUTIONS

[75] Inventors: Perry A. Argabright, Larkspur; Larry M. Echelberger; Brian L. Phillips, both of Littleton, all of Colo.

[73] Assignee: Marathon Oil Company, Findlay, Ohio

[22] Filed: Nov. 2, 1973

[21] Appl. No.: 412,056

[52] U.S. Cl. .................................. 210/54; 75/108
[51] Int. Cl. ............................................ C02c 5/02
[58] Field of Search ............... 75/101 BE, 107, 108; 210/42, 50, 54; 260/77.5 NC

[56] References Cited
UNITED STATES PATENTS
3,479,378   11/1969   Orlandini et al. ............... 75/101 BE
3,573,259   3/1971   Argabright et al. ......... 260/77.5 NC Primary Examiner—Samih N. Zaharna
Assistant Examiner—Peter A. Hruskoci
Attorney, Agent, or Firm—Joseph C. Herring; Richard C. Willson, Jr.; J. L. Hummel

[57] ABSTRACT

Metals can be removed from aqueous solution via addition of water-soluble polyisocyanurate compositions. The metals are recovered as insoluble isocyanurate salts, and the present invention is operable in the presence of common hard water ions, e.g., calcium and magnesium.

4 Claims, No Drawings

PRECIPITATION OF METALS FROM AQUEOUS SOLUTIONS

BACKGROUND OF THE INVENTION

1. Field of the Invention

The present invention relates to the precipitation of metal salts from aqueous solutions.

2. Description of the Prior Art

Conventional methods for the removal of metals by precipitation generally involve the dissolving into the solution containing the metals a soluble salt having an anion which, on reaction with the metal, forms an insoluble salt of the metal. The disadvantage of most of these conventional methods is that other cations, e.g., Ca, and Mg, which are commonly more abundantly present in such aqueous solutions also react with the added precipitants, thus interfering with the removal of metals. The present invention, provides a selective removal of metals in the presence of other cations, e.g., calcium and magnesium with only minor loss of precipitant by reaction with such other cations.

SUMMARY

General Statement of the Invention

The present invention adds soluble salts, e.g., alkali metal or ammonium salts of polyisocyanuric acids, to aqueous solutions which contain metals, e.g., mercury.

The invention embodies the discovery that the soluble salts of polyisocyanuric acids provide excellent removal of metals with minimum loss of polyisocyanurate salt precipitants through reaction with calcium, magnesium, and other extraneous cations.

Utility of the Invention

The invention is useful for the removal of metals from a wide variety of aqueous solutions including industrial and commercial effluents, for purification of process streams, thereby preventing precipitations on internal screens or filters; for removal of metals from ingestible liquids, e.g., drinking water, for removal of metals where they could react with commercial products, e.g., as in catalyst production or in hydrocarbon conversion processes.

DESCRIPTION OF THE PREFERRED EMBODIMENTS

Starting Materials:

Isocyanurate Salts:

The isocyanurate compositions for use in the present invention are water-soluble materials, which in aqueous solution react with metals to form precipitates. The most preferred polyisocyanurate compounds have the structure:

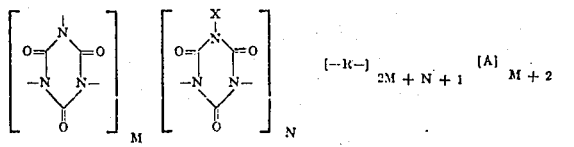

where

R = divalent radical $x$ = an alkali metal (e.g. Na, K, Li) alkaline earth e.g., Ca, Mg, or hydrogen, quaternary ammonium, e.g., mono-, di-, tri-, or tetra-lower alkyl-substituted ammonium and unsubstituted ammonium, or a combination thereof A = a monovalent group selected from the following: isocyanate, urethane ($NHCO_2R'$), urea, amino R' = monovalent radical M = average number of trisubstituted isocyanurate rings N = average number of isocyanuric acid and/or isocyanurate salt groups 2M+N+1 = average number of divalent R groups M+2 = average number of A groups wherein R preferably contains two to 40, more preferably two to 30, and most preferably four to 18 carbon atoms; R' preferably contains one to 40, more preferably one to 20, and most preferably one to 10 carbon atoms, and wherein there are no N—to—N bonds and no A—to—N bonds, and no A—to—A bonds, and no R—to—R bonds.

These starting materials can be produced by known processes, e.g., those described in U.S. Pat. No. 3,573,259, to Perry A. Argabright, Brian L. Phillips, and Joe T. Kelly entitled "Process for the Preparation of Isocyanurate-containing Polyisocyanate Salts."

Preferably, the polyisocyanurate salts will be present in a ratio equivalent to from about 0.5 to about 5, more preferably from about 1.0 to about 4, and most preferably from about 1.5 to about 3.5 moles of basic isocyanurate salt groups for each mole of metals present in the aqueous solution to be treated.

Aqueous Solutions:

The aqueous solutions of the present invention can contain, in addition to the metals which are to be removed, concentrations of other anions and cations. It is a particular feature of the present invention that extraneous cations such as calcium or magnesium do not interfere with the precipitation process.

Metals:

The preferred metals to be removed, according to the present invention, include Hg, Ba, Al, Cu, Fe, Cr, Co, Ni, Sb, and Sn. The process of the invention is particularly preferred for the removal of mercury, lead, and barium, and most preferred for the removal of mercury other metals which can be removed by the invention include Ti, V, U, La and Sb.

EXAMPLE I

Preparation of Polyisocyanurate Salt

A 4.0 liter four-necked glass reactor equipped with a motor driven stirrer, reflux condenser, thermometer and adapter for introducing liquids is charged with 121.5 g of KOCN (1.5 mole) and 3.0 liters of anhydrous dimethylformamide (DMF). To the resulting slurry at 75°C., is added 224 ml of tolylene diisocyanate (1.58 moles) at a rate of 3.22 ml./min. by means of a motor driven syringe pump. After the addition is complete the mixture is allowed to react an additional 10 min., 420 ml. of anhydrous methanol added, and the resulting mixture stirred an additional 1.5 hours at 75°C. The desired product is collected by filtration of the crude reaction mixture, extracted with acetone in a blender, filtered, and dried at 80°C. in vacuo to yield 286.8 g of a white powder. The product is quite soluble in water, but relatively unsoluble in hydrocarbon solvents.

The ratio of aromatic rings to end groups:

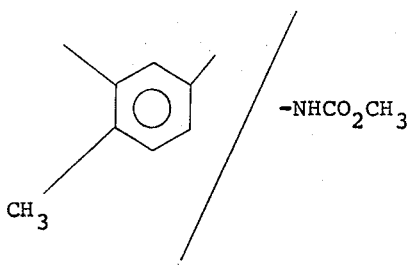

is measured by n.m.r. (in $D_2O$) and found to be 9.7. This corresponds to a minimum average molecular weight of approximately 4600.

EXAMPLES II–V

Aqueous solutions containing mercuric ion ($Hg^{++}$) in the form of $Hg(ClO_4)_2$ are contacted with appropriate volumes of a 3% (by wt.) solution of the polyisocyanurate (prepared in Example I) to give solutions with an initial $Hg^{++}$ concentration of 331 ppm at several isocyanurate anion to $Hg^{++}$ mole ratios. The resulting solutions are allowed to react for 16 hours quantitatively filtered to remove the precipitate and the filtrate analyzed for $Hg^{++}$ by atomic absorption. The results are summarized below:

| Example | Moles Isocyanurate[1] Anion per mole $Hg^{++}$ | PPM $Hg^{++}$ |
|---|---|---|
| II | 2 | 6 |
| III | 4 | 228 |
| IV | 8 | 288 |
| V | 0 | 331[2] |

[1]estimated from general formula for M=o
[2]nominal initial concentration of $Hg^{++}$ in the absence of polyisocyanurate precipitant.

These examples demonstrate both the effectiveness of polyisocyanurate salts as precipitants for $Hg^{++}$ and the role that stoichiometry (isocyanurate anion to $Hg^{++}$ ratio) plays on precipitation efficiency.

EXAMPLES VI–IX

In a manner identical to Examples II–V, the polyisocyanurate salt of Example I is tested as a precipitant for plumbous ion ($Pb^{++}$) in the form of $Pb(NO_3)_2$. Again, the results demonstrate the role of the ratio of isocyanurate anion to cation or precipitation efficiency.

| Examples | Moles Isocyanurate anion[1] per mole $Pb^{++}$ | PPM $Pb^{++}$ |
|---|---|---|
| VI | 2 | 21 |
| VII | 4 | 241 |
| VIII | 8 | 251 |
| IX | 0 | 271[2] |

[1]estimated from the general formula for M=o
[2]concentration of $Pb^{++}$ in the absence of polyisocyanurate salt precipitant.

EXAMPLES X–XX

The following examples demonstrate the selectivity of polyisocyanurate salts as precipitants for metal ions. Thus aqueous solutions of the indicated metal salt are treated with an excess of the polyisocyanurate salt of Example I. The pH of the resulting solutions is 9.0. In all cases no precipitate was observed when the metal salt solution was adjusted to a pH of 9 with NaOH in the absence of polyisocyanurate salt.

| Example | $M^{+n}$ | Salt | Precipitate Formation[1] |
|---|---|---|---|
| X | $Zn^{++}$ | $ZnCl_2$ | + |
| XI | $Fe^{+++}$ | $FeCl_3$ | + |
| XII | $Co^{++}$ | $Co(ClO_4)_2$ | + |
| XIII | $Al^{+++}$ | $Al_2(SO_4)_3$ | + |
| XIV | $Ni^{++}$ | $Ni(NO_3)_2$ | + |
| XV | $Ba^{++}$ | $Ba(NO_3)_2$ | + |
| XVI | $Sn^{++++}$ | $SnCl_4$ | + |
| XVII | $Cr^{+6}$ | $Na_2Cr_2O_3$ | + |
| XVIII | $Ca^{++}$ | $CaCl_2$ | − |
| XIX | $Mg^{++}$ | $MgCl_2$ | − |
| XX | $Sr^{++}$ | $SrCl_2$ | − |

[1] + indicates precipitate formation;
− indicates no precipitate.

Modifications of the Invention

It should be understood that the invention is capable of a variety of modifications and variations which will be made apparent to those skilled in the art by a reading of the specification and which are to be included within the spirit of the claims appended hereto.

What is claimed is:

1. A method for the removal of metals by precipitation of of metal salts from aqueous solutions comprising dissolving into said aqueous solutions, polyisocyanurate salts which are soluble in said aqueous solutions wherein said polyisocyanurate salts are selected from the group consisting of alkali metal and ammonium salts of polyisocyanuric acids and wherein said metals are selected from the groups consisting of Al, Ti, V, Cr, Mn, Fe, Co, Ni, Cu, Zn, Ga, Ge, Y, Zr, Nb, Mo, Tc, Ru, Rh, Pd, Ag, Cd, In, Sn, Sb, Ba, La, Hf, Ta, W, Re, Os, Ir, Pt, Au, Hg, Tl, Pb, Bi, Ra, Ac, Th, Pa, and U, wherein said isocyanurate salts have the structure:

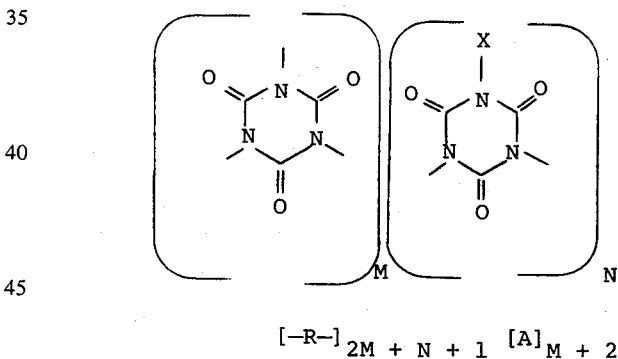

and wherein

R = a divalent radical containing 2 to about 40 carbon atoms

X = an alkali metal, alkaline earth metal, or quarternary ammonium radical or combination thereof;

A = a monovalent group selected from the following: isocyanate, urethane ($NHCO_2R'$), urea and amino radicals;

R' = a monovalent radical containing 1 to about 40 carbon atoms

M = the average number of trisubstituted isocyanurate rings

N = the average number of isocyanurate acid and/or isocyanurate salt groups;

2M + N + 1 = average of divalent R groups

M + 2 = average number of A groups and wherein there are no N—to—N bonds and no A—to—N bonds, and no A—to—A bonds, and no R—to—R bonds, and wherein said polyisocyanurate salts are present in a ratio equivalent to from about 0.5 to about 5 moles of basic isocyanurate salt groups for each mole of metals present in said aqueous solutions to be treated.

2. A process according to claim 1 wherein said metals are selected from the group consisting of Hg, Ba, Al, Zn, Fe, Cr, Co, Ni, Pb, Sn, and mixtures of the foregoing.

3. A process according to claim 1 wherein said metals are selected from the group consisting of Hg, Ba, Al, Cu, Fe, Cr, Co, Ni, Sb, and Sn.

4. A process according to claim 1 wherein said metals are selected from the group consisting of Hg.

* * * * *